(12) United States Patent
Choi

(10) Patent No.: US 8,804,846 B2
(45) Date of Patent: Aug. 12, 2014

(54) METHOD AND APPARATUS FOR PROCESSING SIGNALS

(75) Inventor: Young-ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 12/417,118

(22) Filed: Apr. 2, 2009

(65) Prior Publication Data

US 2010/0002144 A1 Jan. 7, 2010

(30) Foreign Application Priority Data

Jul. 1, 2008 (KR) ........................ 10-2008-0063666

(51) Int. Cl.
| | | |
|---|---|---|
| H04N 7/12 | (2006.01) | |
| H04N 11/02 | (2006.01) | |
| H04N 11/04 | (2006.01) | |
| H04N 5/44 | (2011.01) | |
| H04N 5/455 | (2006.01) | |
| H04N 21/426 | (2011.01) | |
| H04N 21/438 | (2011.01) | |
| H04N 5/46 | (2006.01) | |

(52) U.S. Cl.
CPC ......... *H04N 5/455* (2013.01); *H04N 21/42638* (2013.01); *H04N 21/4382* (2013.01); *H04N 5/46* (2013.01)
USPC .... 375/240.26; 348/725; 348/726; 348/439.1

(58) Field of Classification Search
USPC .................................................. 375/240.26
See application file for complete search history.

(56) References Cited

U.S. PATENT DOCUMENTS

| | | | | |
|---|---|---|---|---|
| 3,982,063 | A | * | 9/1976 | Brown et al. .............. 348/439.1 |
| 4,779,222 | A | * | 10/1988 | Harrison et al. .............. 713/502 |
| 5,636,186 | A | * | 6/1997 | Yamamoto et al. ........ 369/47.23 |
| 7,250,987 | B2 | * | 7/2007 | Goyal et al. .................. 348/725 |
| 2005/0280742 | A1 | * | 12/2005 | Jaffe .............................. 348/726 |
| 2006/0001779 | A1 | * | 1/2006 | Favrat et al. .................. 348/725 |

FOREIGN PATENT DOCUMENTS

| | | |
|---|---|---|
| CN | 1652579 A | 8/2005 |
| CN | 1969545 A | 5/2007 |

OTHER PUBLICATIONS

Communication dated Jan. 14, 2013 issued by the State Intellectual Property Office of P.R. China in counterpart Chinese Patent Application No. 200910135124.X.
Communication dated Jul. 12, 2013 issued by the State Intellectual Property Office of P.R. China in counterpart Chinese Patent Application No. 200910135124.X.
Communication dated Feb. 12, 2014 issued by the State Intellectual Property Office of P.R. China in counterpart Chinese Patent Application No. 200910135124.X.

* cited by examiner

*Primary Examiner* — Hee-Yong Kim
(74) *Attorney, Agent, or Firm* — Sughrue Mion, PLLC

(57) ABSTRACT

An integrated circuit device for processing a signal includes: a digital television (DTV) demodulator which receives and demodulates a modulated DTV signal, and outputs a demodulated DTV signal; an analog TV demodulator which receives and demodulates a modulated analog TV signal, and outputs a demodulated first analog TV signal; and a multiplexer which receives the demodulated DTV signal from the DTV demodulator and the demodulated first analog TV signal from the analog TV demodulator, and selectively outputs one of the demodulated DTV signal and the demodulated first analog TV signal.

9 Claims, 3 Drawing Sheets

METHOD AND APPARATUS FOR PROCESSING SIGNALS

CROSS-REFERENCE TO RELATED APPLICATION

This application claims priority from Korean Patent Application No. 10-2008-0063666, filed on Jul. 1, 2008 in the Korean Intellectual Property Office, the disclosure of which is incorporated herein by reference.

BACKGROUND OF INVENTION

1. Field of Invention

Apparatuses and methods consistent with the present invention relate to an integrated circuit device for processing signals and an image processing apparatus having the same, and more particularly to an integrated circuit device for processing analog and digital television signals and an image processing apparatus having the same.

2. Description of the Related Art

An image processing apparatus, such as a television, a set-top box, or the like, receives and processes a broadcasting signal to output an image and a sound. The image processing apparatus includes signal processing components, such as a demodulator, a decoder, etc., to process the broadcasting signal. The signal processing components may be achieved by at least one integrated circuit (IC) device, called an IC chip.

In designing the integrated circuit device for processing the broadcasting signal, several considerations are taken into account.

For example, the integrated circuit device should support various broadcasting methods. In the case of analog television broadcasting, there are broadcasting methods such as National Television System Committee (NTSC), Phase Alternating Line (PAL), Sequential Couleur Avec Memoire (SE-CAM), etc. In the case of digital television broadcasting, there are broadcasting standards such as 8-level Vestigial Sideband (8VSB), Integrated Services Digital Broadcasting-Terrestrial (ISDB-T), Digital Video Broadcasting-Terrestrial (DVB-T), Digital Multimedia Broadcasting-Terrestrial Handheld (DMB-TH), etc. To support such various broadcasting methods, the integrated circuit device must be designed to process corresponding signals accordingly.

Furthermore, reducing the cost of the integrated circuit device is a design consideration. Costs can be reduced by decreasing the number of integrated circuit devices in the image processing apparatus. For example, various signal processing functions may be embedded in a single integrated circuit device.

However, the above considerations conflict with each other, thus, it is difficult to design an integrated circuit device satisfying both considerations.

Further, if two or more integrated circuit devices are provided in the image processing apparatus, they have to be designed to effectively interface with each other.

SUMMARY OF THE INVENTION

Illustrative, non-limiting embodiments of the present invention overcome the above disadvantages, and other disadvantages not described above. Also, the present invention is not required to overcome the disadvantages described above, and an illustrative, non-limiting embodiment of the present invention may not overcome any of the problems described above.

It is an aspect of the present invention to provide integrated circuit devices which support various broadcasting methods, reduce costs, and effectively interface with each other, and an image processing apparatus having the same.

According to an aspect of the present invention, there is provided an integrated circuit device for processing a signal, including: a digital television (DTV) demodulator which receives and demodulates a modulated DTV signal, and outputs a demodulated DTV signal; an analog TV demodulator which receives and demodulates a modulated analog TV signal, and outputs a demodulated first analog TV signal; and a multiplexer which receives the demodulated DTV signal from the DTV demodulator and the demodulated first analog TV signal from the analog TV demodulator, and selectively outputs one of the demodulated DTV signal and the demodulated first analog TV signal.

The demodulated first analog TV signal may include a video signal.

The analog TV demodulator may demodulate the modulated analog TV signal in a digital manner, and outputs a demodulated second analog TV signal.

The demodulated second analog TV signal may include an audio signal.

The multiplexer may select one of the demodulated DTV signal and the demodulated first analog TV signal in response to a control signal.

The integrated circuit device further includes an analog/digital (AD) converter which applies AD conversion to the modulated DTV signal and the modulated analog TV signal to be transmitted to the DTV demodulator and the analog TV demodulator, respectively.

The integrated circuit device further includes a tuner which is tuned to the modulated DTV signal and the modulated analog TV signal to undergo the AD conversion of the AD converter.

According to another aspect of the present invention, there is provided an integrated circuit device for processing a signal, including: DTV signal processing unit which applies a first signal process to a demodulated DTV signal; a first analog TV signal processing unit which applies a second signal process to a demodulated first analog TV signal; and a demultiplexer which receives the demodulated DTV signal or the demodulated first analog TV signal from an outside, and selectively outputs the received signal to one of the DTV signal processing unit and the first analog TV signal processing unit.

The demodulated first analog TV signal may include a video signal.

The integrated circuit device further includes a second analog TV signal processing unit which receives a second analog TV signal demodulated in a digital manner, and applies a third signal process to the demodulated second analog TV signal.

The demodulated second analog TV signal may include an audio signal.

The integrated circuit device further includes a controller which controls the demultiplexer to selectively output the demodulated DTV signal or the demodulated first analog TV signal to one of the DTV signal processing unit and the first analog TV signal processing unit.

The controller may output a control signal to another integrated circuit device for controlling the another integrated circuit device to selectively output one of the demodulated DTV signal and the demodulated first analog TV signal.

The first and second signal processes to be applied to the demodulated DTV signal and the demodulated analog TV signal may include at least one of transport stream demultiplexing, video decoding, audio decoding, and scaling.

According to another aspect of the present invention, there is provided an image processing apparatus including: a first integrated circuit device which demodulates a modulated DTV signal and a modulated analog TV signal, and selectively outputs one of a demodulated DTV signal and a demodulated first analog TV signal to a common transmission line; and a second integrated circuit device which receives the demodulated DTV signal or the demodulated first analog TV signal from the first integrated circuit device through the common transmission line, and selectively applies a corresponding signal process to one of the demodulated DTV signal and the demodulated first analog TV signal.

The demodulated first analog TV signal may include a video signal.

The first integrated circuit device may demodulate the modulated analog TV signal in a digital manner and outputs a demodulated second analog TV signal to the second integrated circuit device through a different transmission line from the common transmission line, and the second integrated circuit device may receive the demodulated second analog TV signal through the different transmission line and applies a signal process to the demodulated second analog TV signal.

The demodulated second analog TV signal may include an audio signal.

The second integrated circuit device may output a control signal to the first integrated circuit device so that the first integrated circuit device selectively outputs one of the demodulated DTV signal and the demodulated first analog TV signal, and the first integrated circuit device may select one of the demodulated DTV signal and the demodulated first analog TV signal in response to the control signal output from the second integrated circuit device.

The first integrated circuit device may perform at least one of tuning and AD conversion with regard to the modulated DTV signal and the modulated analog TV signal.

The signal process of the second integrated circuit device with regard to the demodulated DTV signal and the demodulated analog TV signal may include at least one of transport stream demultiplexing, video decoding, audio decoding, and scaling.

The image processing apparatus further includes a display unit to display an image based on the demodulated DTV signal and/or the demodulated analog TV signal processed by the second integrated circuit device.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
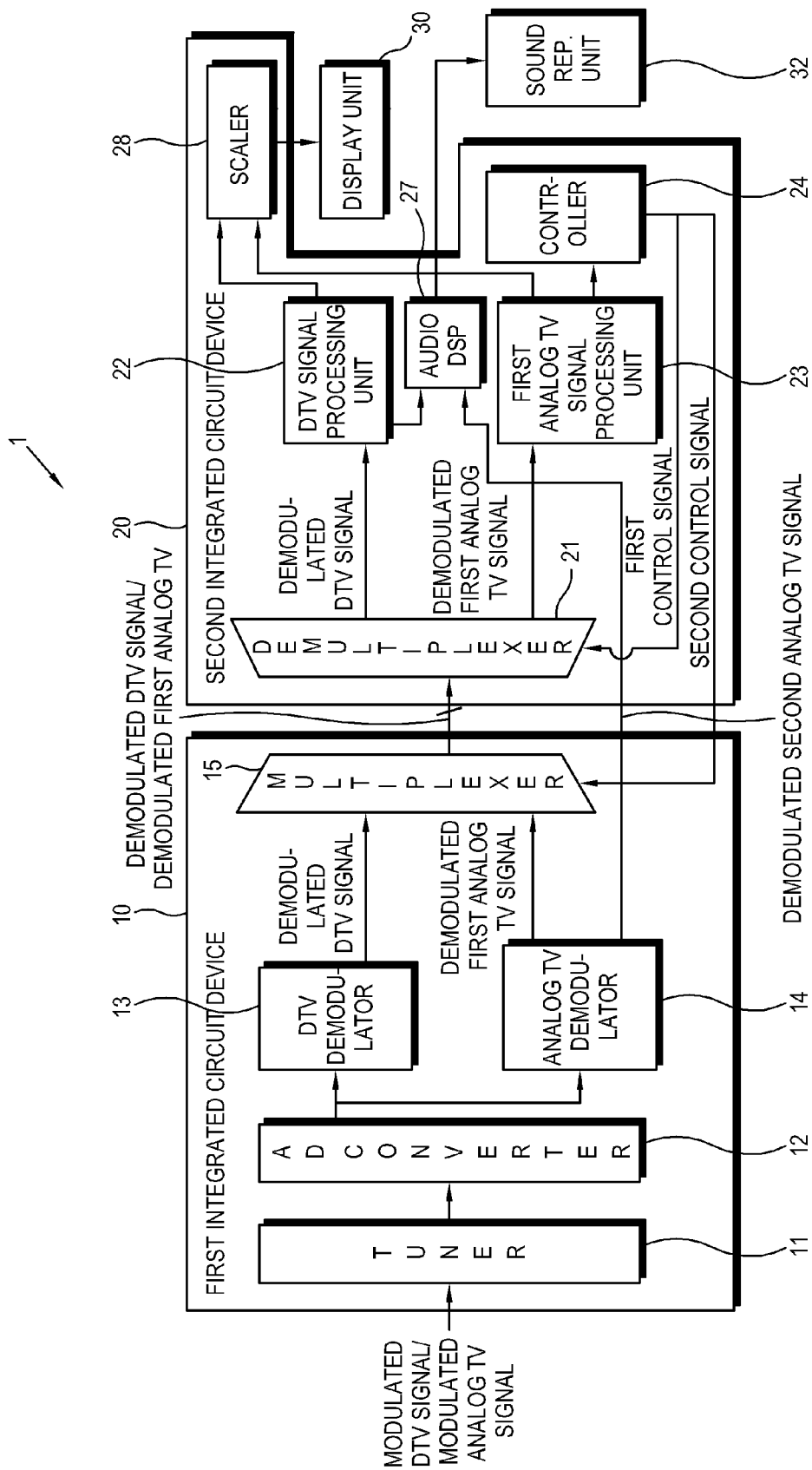
FIG. 1 shows a configuration of an image processing apparatus according to an exemplary embodiment of the present invention.

Exemplary embodiments of the present invention will be described in detail with reference to accompanying drawings so as to be easily realized by a person having ordinary knowledge in the art. The present invention may be embodied in various forms without being limited to the exemplary embodiments set forth herein, and descriptions of well-known parts may be omitted for clarity. Further, like reference numerals refer to like elements throughout.

FIG. 1 shows a configuration of an image processing apparatus 1 according to an exemplary embodiment of the present invention. The image processing apparatus 1 may be achieved by a TV, a set-top box for the TV, a TV tuner card for a computer system, etc. As shown in FIG. 1, the image processing apparatus 1 includes a first integrated circuit device 10, and a second integrated circuit device 20. Here, the first integrated circuit device 10 and the second integrated circuit device 20 may be each realized by an electronic circuit such as an integrated circuit (IC), a chip, an IC chip, a microchip, or the like.

The first integrated circuit device 10 according to an exemplary embodiment of the present invention is designed to support various broadcasting methods, and serves to demodulate and process a broadcasting signal. As shown in FIG. 1, the first integrated circuit device 10 according to an exemplary embodiment of the present invention includes a tuner 11, an analog to digital (AD) converter 12, a digital television (DTV) demodulator 13, an analog TV demodulator 14, and a multiplexer 15. Alternatively, at least one of the tuner 11 and the AD converter 12 may be provided in a separate integrated circuit device (not shown).

The tuner 11 receives a radio frequency (RF) signal, such as a broadcasting signal, and converts the RF signal into an analog intermediate frequency (IF) signal. The broadcasting signal received by the tuner 11 includes an analog TV signal and a DTV signal. The analog TV signal and the DTV signal are modulated in a transmitter (not shown) that transmits the broadcasting signal. Here, the tuner 11 receives the broadcasting signal corresponding to a certain channel in response to an input control signal (not shown).

The AD converter 12 converts an analog IF signal output from the tuner 11 into a digital IF signal. According to an exemplary embodiment of the present invention, the output of the AD converter 12 has a 12 bit resolution. Hence, the outputs of the DTV demodulator 13 and the analog demodulator 14 also have a 12 bit resolution. The demodulated DTV signal containing the TS signal may require a 12 bit line for transmission to the second integrated circuit device 20 (eight TS data lines, a TS clock line, a TS error line, a TS valid line and a TS synchronous line). Accordingly, when 12 bit output data of the analog demodulator 14 is transmitted by a 12 bit line in parallel, both transmission line widths for the demodulated DTV signal and the demodulated first analog TV signal may be the same as 12 bits. After all, the multiplexer 15 may be designed as a simpler structure with a 12 bit output line width and the transmission of the multiplexed demodulated DTV signal/demodulated first analog TV signal may be more reliable.

The DTV demodulator 13 and the analog TV demodulator 14 demodulate the digital IF signal output from the AD converter 12. Here, the DTV demodulator 13 may perform demodulation based on at least one of 8VSB, ISDB-T, DVB-T and DMB-TH, and the analog TV demodulator 14 may perform demodulation based on at least one of NTSC, PAL, and SECAM. Alternatively, the analog TV demodulator 14 may selectively perform the demodulation through one of NTSC, PAL and SECAM.

The DTV demodulator 13 and the analog TV demodulator 14 perform the demodulation to output a demodulated DTV signal and a demodulated analog TV signal, respectively. The demodulated DTV signal may contain a transport stream (TS) signal, wherein a digital-compressed video signal and a digital-compressed audio signal are mixed in sequence.

The demodulated analog TV signal may contain a demodulated first analog TV signal and a demodulated second analog TV signal. The demodulated first analog TV signal and the demodulated second analog TV signal may be a video signal and an audio signal, respectively. The demodulated first analog TV signal may contain a composite video baseband signal (CVBS), and the demodulated second analog TV signal may contain a sound intermediate frequency (SIF) having a mean frequency of 4.5 MHz, for example.

The analog TV demodulator 14 transmits the demodulated second analog TV signal to the second integrated circuit device 20 in a digital manner. According to an exemplary embodiment of the present invention, the transmission manner of the second integrated circuit device 20 is based on I2S (inter-IC sound or integrated interchip sound).

The multiplexer 15 receives the demodulated DTV signal from the DTV demodulator 13 and the demodulated first analog TV signal from the analog TV demodulator 14, and selectively outputs one of them to the second integrated circuit device 20. In this case, the demodulated DTV signal and the demodulated first analog TV signal may have the same bit depth resolution. For example, the demodulated DTV signal and the demodulated first analog TV signal may each have a 12-bit depth resolution.

The multiplexer 15 may select one of the demodulated DTV signal and the demodulated first analog TV signal in response to a control signal which is externally input. According to an exemplary embodiment of the present invention, the multiplexer 15 receives the control signal from the second integrated circuit device 20.

According to an exemplary embodiment of the present invention, the second integrated circuit device 20 is designed for processing a signal regardless of the broadcasting method used to create the signal. Referring to FIG. 1, the second integrated circuit device 20 according to an exemplary embodiment of the present invention includes a demultiplexer 21, a DTV signal processing unit 22, a first analog TV signal processing unit 23, and a control unit 24. Alternatively, the controller 24 may be provided in another integrated circuit device (not shown).

The demultiplexer 21 receives the demodulated DTV signal or the demodulated first analog TV signal from the first integrated circuit device 10, and outputs it selectively to either of the DTV signal processing unit 22 or the first analog TV signal processing unit 23. The demultiplexer 21 may select one of the DTV signal processing unit 22 and the first analog TV signal processing unit 23 according to a first control signal output from the controller 24.

The second integrated circuit device 20 according to an exemplary embodiment of the present invention may further include an audio digital signal processor (DSP) 27 and a scaler 28, which are utilized for DTV signal processing and analog TV signal processing. The audio DSP 27 and the scaler 28 will be explained later in further detail.

Figure 2:
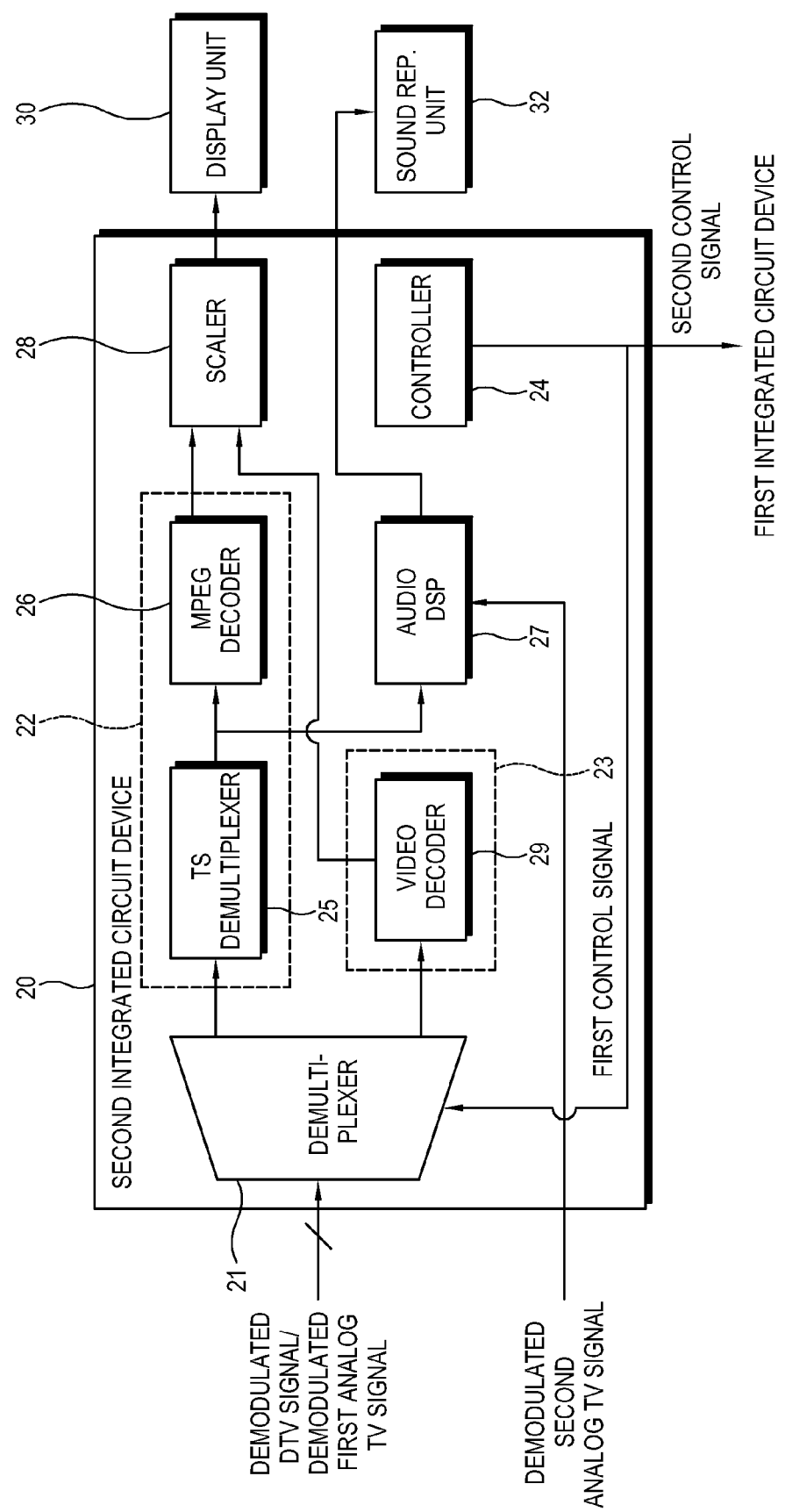
FIG. 2 shows a detailed configuration of a second integrated circuit device according to an exemplary embodiment of the present invention.

FIG. 2 shows a detailed configuration of the second integrated circuit device 20 according to an exemplary embodiment of the present invention. As shown in FIG. 2, the DTV signal processing unit 22 may include a transport stream (TS) demultiplexer 25 and a Moving Picture Expert Group (MPEG) decoder 26. In addition, although not shown, the DTV signal processing unit 22 may further include at least one of the audio DSP 27 and the scaler 28.

The TS demultiplexer 25 divides the demodulated DTV signal, in which the digital video signal and the digital audio signal are mixed in sequence, into the digital video signal and the digital audio signal.

The MPEG decoder 26 receives the digital video signal from the TS demultiplexer 25 and decodes the digital video signal compressed in an MPEG manner.

The audio DSP 27 receives the digital audio signal from the TS demultiplexer 25 and applies a digital audio process to the digital audio signal.

The scaler 28 applies scaling to the digital video signal of various formats, which is a signal decoded and output from the MPEG decoder 26. For example, the scaler 28 may convert a signal of 480P into a signal of 1080P.

The first analog TV signal processing unit 23 according to an exemplary embodiment of the present invention may include a video decoder 29 as shown in FIG. 2. In addition, although not shown, the first analog TV signal processing unit 23 may further include at least one of the audio DSP 27 and the scaler 28. Here, the video decoder 29 decodes the demodulated first analog TV signal output from the demultiplexer 21.

The audio DSP 27 applies the audio process to the demodulated second analog TV signal, e.g., an analog audio signal output from the first integrated circuit device 10.

The scaler 28 applies the scaling to the video signal of various formats, which is an analog TV signal decoded and output from the video decoder 29.

The audio DSP 27 is an example of a second analog TV signal processing unit.

The controller 24 outputs a second control signal to the first integrated circuit device 10, so that the first integrated circuit device 10 can selectively output one of the demodulated DTV signal and the demodulated first analog TV signal. Further, the controller 24 controls the demultiplexer 21 to selectively output the demodulated DTV signal or the demodulated first analog TV signal to one of the DTV signal processing unit 22 and the first analog TV signal processing unit 23. The controller 24 controls the demultiplexer 21 to select the DTV signal processing unit 22 when controlling the first integrated circuit device 10 to output the demodulated DTV signal. Further, the controller 24 controls the demultiplexer 21 to select the first analog TV signal processing unit 23 when controlling the first integrated circuit device 10 to output the demodulated first analog TV signal. Here, the controller 24 may include a read only memory (ROM) and a random access memory (RAM) to save and load a control program, and a central processing unit (CPU) to execute the control program.

According to an exemplary embodiment of the present invention, the processing of the broadcasting signal is shared between the first integrated circuit device 10 and the second integrated circuit device 20. That is, the first integrated circuit device 10 is configured to correspond to various broadcasting methods, and the second integrated circuit device 20 is configured to process the signal, thereby supporting various broadcasting environments and reducing costs by minimizing the number of integrated circuit devices.

The image processing apparatus 1 may further include a printed circuit board (PCB) (not shown) provided with the first integrated circuit device 10 and the second integrated circuit device 20. The PCB may be provided with a common transmission line (not shown) through which one of the demodulated DTV signal and the demodulated first analog TV signal is selectively transmitted from the first integrated circuit device 10 to the second integrated circuit device. The common transmission line corresponds to the bit depth of the demodulated DTV signal and the demodulated first analog TV signal.

Figure 3:
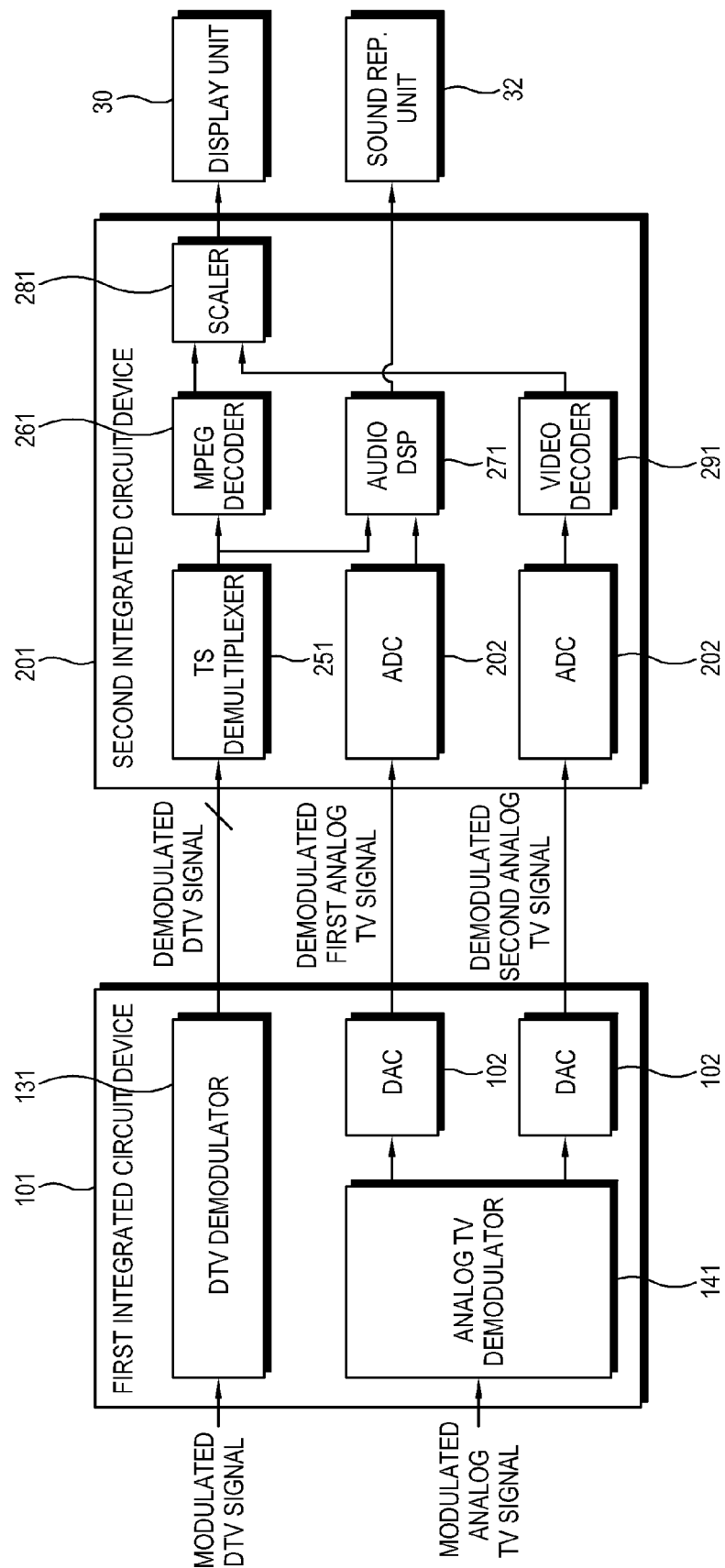
FIG. 3 shows that a demodulated DTV signal and a demodulated analog TV signal are individually transmitted between a first integrated circuit device and a second integrated circuit device according to related art of the present invention.

FIG. 3 shows that the demodulated DTV signal and the demodulated analog TV signal are individually transmitted between a first integrated circuit device 101 and a second integrated circuit device 201 according to related art of the present invention. As shown in FIG. 3, the demodulated DTV signal and the demodulated analog TV signal respectively output from a DTV demodulator 131 and an analog TV demodulator 141 of the first integrated circuit device 101 are individually transmitted to a TS demultiplexer 251, a video decoder 291, an audio DSP 271 and a scaler 281 of the second integrated circuit device 201.

On the other hand, according to an exemplary embodiment of the present invention, an interface between the first integrated circuit device 10 and the second integrated circuit device 20 allows one of the demodulated DTV signal and the demodulated first analog TV signal to be selectively transmitted through the common transmission line, so that the first integrated circuit device 10 and the second integrated circuit device 20 can be designed to have a lesser number of pins than those of the related art shown in FIG. 3, thereby decreasing the size of the device.

Referring to FIG. 3, the second integrated circuit device 201 is designed to have an analog to digital converter (ADC) 292 to perform AD conversion ahead of the video decoder 291 and the audio DSP 271 in consideration of receiving an analog TV signal from another integrated circuit device (not shown) in an analog transmission manner. To correspond to the second integrated circuit device 201, the first integrated circuit device 101 needs to have the digital to analog converter (DAC) 102 to apply DA conversion to the demodulated first analog TV signal and the demodulated second analog TV signal output from the analog TV demodulator 141 in a digital transmission manner (refer to FIG. 3).

On the other hand, according to an exemplary embodiment of the present invention, the demodulated first analog TV signal and the demodulated second analog TV signal output from the analog TV demodulator 14 in the digital manner are transmitted to the audio DSP 27 without the DA conversion and the AD conversion, so that there is no need for the DAC 102 and the ADC 202, thereby reducing costs and decreasing the sizes of the first and second integrated circuit devices 10 as compared with those of FIG. 3.

Further, according to an exemplary embodiment of the present invention, the image processing apparatus 1 may include a display unit 30 to display an image based on the demodulated DTV signal and/or the demodulated analog TV signal processed by the second integrated circuit device 20, and a sound reproduction unit 32 to reproduce a sound based on the demodulated DTV signal and/or the demodulated analog TV signal processed by the second integrated circuit device 20. Here, the display unit 30 may include a liquid crystal display (LCD), an organic light emitting display (OLED), a plasma display panel (PDP), a digital light processing (DLP), or the like.

As described above, the present invention provides integrated circuit devices which support various broadcasting methods, reduce costs, and effectively interface with each other, and an image processing apparatus having the same.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing apparatus comprising: an integrated circuit device for processing a signal, the first integrated circuit device comprising:
a digital television (DTV) demodulator which demodulates a modulated DTV signal, and outputs a demodulated DTV signal;
an analog TV demodulator which demodulates a modulated analog television TV signal, and outputs a demodulated first analog TV signal; and
a multiplexer which receives the demodulated DTV signal from the DTV demodulator and the demodulated first analog TV signal from the analog TV demodulator, and selectively outputs one of the demodulated DTV signal and the demodulated first analog TV signal to a second integrated circuit device,
wherein the multiplexer selects one of the demodulated DTV signal and the demodulated first analog TV signal in response to a control signal which is externally input from the second integrated circuit device; and the second integrated circuit for processing a signal, the second integrated circuit device comprising: digital television (DTV) signal processing unit which performs a first signal process on the demodulated DTV signal; a first analog television (TV) signal processing unit which performs a second signal process on the demodulated first analog TV signal; a demultiplexer which receives the demodulated DTV signal or the demodulated first analog TV signal from the multiplexer of the first integrated circuit device, and selectively outputs the received signal to one of the DTV signal processing unit and the first analog TV signal processing unit; and a controller which outputs a first control signal to control the demultiplexer to selectively output the demodulated DTV signal or the demodulated first analog TV signal, and outputs a second control signal to the first integrated circuit device to control the first integrated circuit device to selectively output one of the demodulated DTV signal and the demodulated first analog TV signal.

2. The image processing apparatus according to claim 1, wherein the demodulated first analog TV signal comprises a video signal.

3. The image processing apparatus according to claim 1, wherein the analog TV demodulator performs a digital demodulation of the modulated analog TV signal, and outputs a demodulated second analog TV signal.

4. The image processing apparatus according to claim 3, wherein the demodulated second analog TV signal comprises an audio signal.

5. The image processing apparatus according to claim 1, wherein the first integrated circuit device further comprises an analog to digital (AD) converter which applies AD conversion to the modulated DTV signal and the modulated analog TV signal and outputs the modulated DTV signal and the modulated analog TV signal in digital form to the DTV demodulator and the analog TV demodulator, respectively.

6. The integrated circuit device according to claim 5, wherein a number of bits corresponding to a bit resolution of the AD converter matches a number of lines corresponding to an output line width of the multiplexer.

7. The image processing apparatus according to claim 1, wherein the first integrated circuit device further comprises a second analog TV signal processing unit which receives a demodulated second analog TV signal and performs a third signal process on the demodulated second analog TV signal.

8. The image processing apparatus according to claim 1, wherein the first signal process comprises at least one of transport stream demultiplexing, video decoding, audio decoding, and scaling.

9. The image processing apparatus according to claim 1, wherein the second signal process comprises at least one of video decoding, audio decoding, and scaling.

* * * * *